United States Patent [19]

Frantz et al.

[11] Patent Number: 5,099,811
[45] Date of Patent: Mar. 31, 1992

[54] METHOD FOR FIRING SPARK PLUGS

[75] Inventors: Douglas C. Frantz, Lake Orion; Martin G. Yagley, Sterling Heights, both of Mich.

[73] Assignee: Chrysler Corporation, Highland Park, Mich.

[21] Appl. No.: 698,528

[22] Filed: May 10, 1991

[51] Int. Cl.$^5$ ............................................. F02P 5/00
[52] U.S. Cl. .................................... 123/416; 123/417; 123/414; 364/431.05
[58] Field of Search ............... 123/416, 414, 417, 418, 123/422; 364/431.05

[56] References Cited

U.S. PATENT DOCUMENTS

| | | | |
|---|---|---|---|
| 4,889,095 | 12/1989 | Sogawa | 123/418 |
| 4,895,120 | 1/1990 | Tobinaga et al. | 123/416 |
| 4,924,831 | 5/1990 | Pitco et al. | 123/417 |
| 4,930,477 | 6/1990 | Nanyoshi et al. | 123/422 |
| 4,960,093 | 10/1990 | McDougal et al. | 123/416 |
| 5,009,209 | 4/1991 | Okuda et al. | 123/416 |

Primary Examiner—Raymond A. Nelli
Attorney, Agent, or Firm—Mark P. Calcaterra

[57] ABSTRACT

A method for firing a spark plug in an engine which employs a simulated high data rate signal. The simulated high data rate signal is generated by a preselected number of gaps in a flywheel within a predetermined time segment of each cylinder event time called the spark event. A sensor generates the simulated high data rate signal as the gaps rotate past it. Data pulses are generated and stored within the spark event. In the case of distributorless ignition systems, the spark plug to be fired is identified. In one embodiment, a widened gap in the flywheel is used to perform this identification. The occurrence time of the leaading and trailing edges of the data pulses are received and stored. The rate of rotation including velocity and possibly acceleration is calculated and stored upon the occurence of each pulse. The spark firing time within the spark event is calculated and stored upon the occurrence of each pulse. Finally, the spark plug is fired once within the spark event.

8 Claims, 2 Drawing Sheets

METHOD FOR FIRING SPARK PLUGS

BACKGROUND OF THE INVENTION

1. Technical Field

The present invention relates to ignition systems and more specifically to a high data rate simulation technique for use in firing ignition system spark plugs in proper sequence.

2. Discussion

Modern computer controlled spark advance units control ignition timing based on timing information provided by crankshaft or flywheel position sensors. The spark advance unit uses preceding crankshaft position information to fire an ignition coil. In other words, the spark advance unit extrapolates future crankshaft position from past crankshaft position information.

Under this extrapolation method, ignition timing accuracy during transient or dynamic conditions is directly related to the data rate of the crankshaft position sensor. In a low data rate system spark advance timing is extrapolated over a broader timing interval. If the engine speed changes significantly between one reference interval and the next, inaccurate spark advance is possible. In a high data rate system, spark advance timing is extrapolated over a narrow timing interval using more recently updated timing information. If the engine speed changes significantly between one reference interval and the next, accurate spark advance is still provided.

Unfortunately, a high data rate system requires special hardware, usually in the form of a custom-built integrated circuit, which increases the cost of the system. Additionally, the high data rate system places a significant burden on the spark advance control computer which must process the higher data rate signal while performing other tasks.

SUMMARY OF THE INVENTION

An object of the present invention is to provide a method for calculating spark firing times which is accurate yet does not require a powerful and expensive spark advance control computer.

Accordingly, the invention provides a method for periodically firing spark plugs associated with cylinders of an internal combustion engine in a predetermined firing sequence and within associated cylinder event time intervals. The method includes the steps of generating within a predefined spark event time portion of each cylinder event time interval a plurality of data pulses whose repetition rate is related to rotational speed of the engine, causing one of the plurality of data pulses in a preselected cylinder event time to have a unique pulse width different from any other generated data pulse of any cylinder event time, monitoring for a beginning of a spark event time indicated by an occurrence of a first data pulse in the spark event time, monitoring for the occurrence of the unique pulse width, and thereafter employing the predetermined firing sequence by calculating within each spark event time portion a spark firing time as a function of engine speed determined in accordance with the repetition rate of the data pulses.

BRIEF DESCRIPTION OF THE DRAWINGS

Other objects and advantages will become apparent upon reading the following detailed description and upon reference to the drawings, in which.

DETAILED DESCRIPTION OF THE PREFERRED EMBODIMENT

Figure 1:
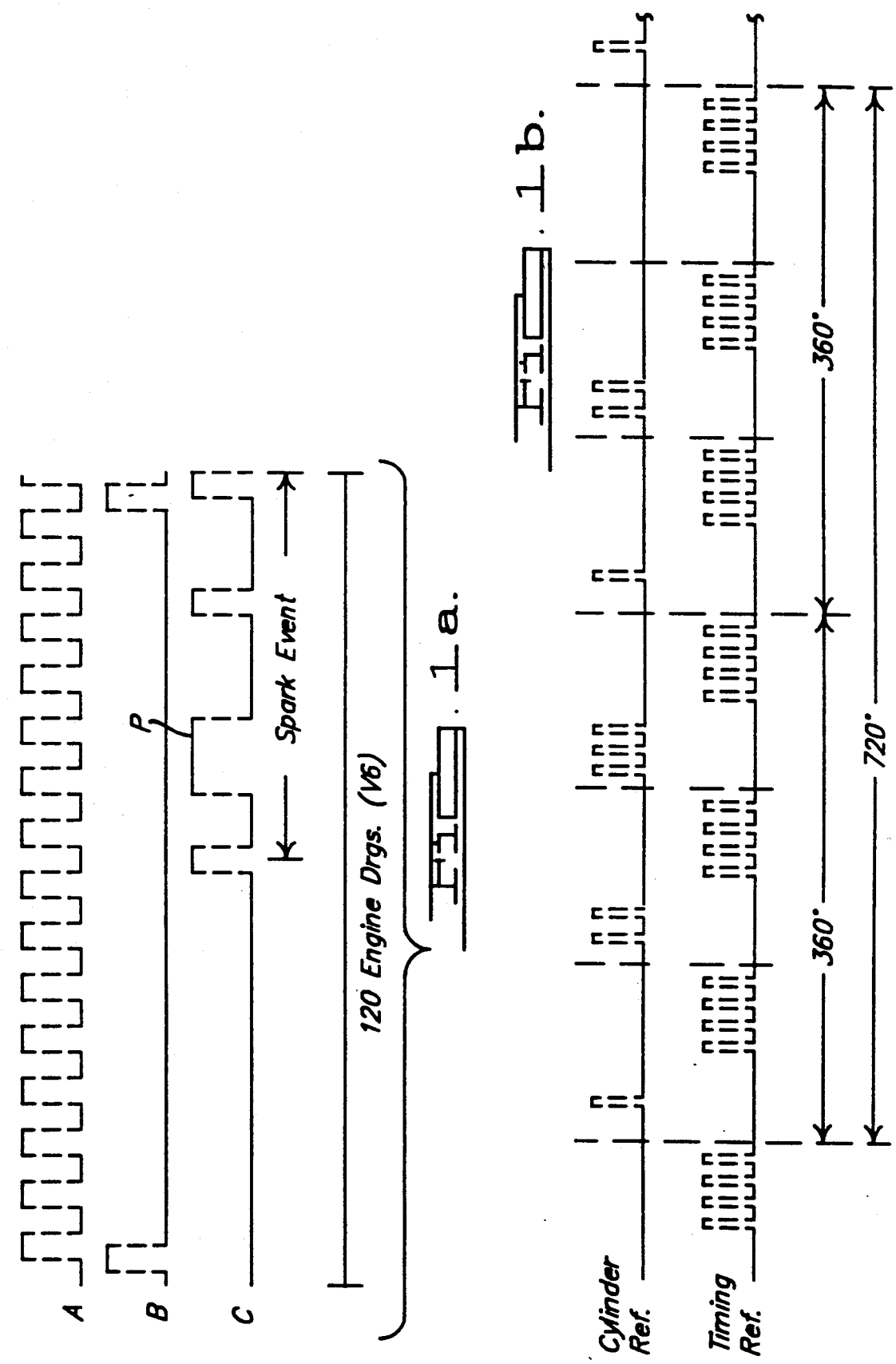
FIG. 1(a) is a timing diagram illustrating a high data rate signal, a low data rate signal, and a simulated high data rate signal with a synchronous identifier pulse for a six cylinder engine and 120 engine degrees.
FIG. 1(b) is a timing diagram illustrating a simulated data rate signal and a camshaft cylinder reference signal for a six cylinder engine over 720 engine degrees.

Turning first to FIG. 1(a), there is shown a high data rate signal A and a low data rate signal B for a six cylinder engine. Although reference will be made throughout this application to a typical six cylinder engine, the present invention is envisioned for use in other engines as well. These signals are referenced to a time period of 120 engine degrees, which corresponds to cylinder event time for a single cylinder. For a six cylinder engine, 720 engine degrees are required to fire all six cylinders. A spark event is defined as the number of engine degrees out of the cylinder event time during which a spark is likely to occur. Sparks occurring at the earliest or leftward-most part of the spark event are advanced the most, and sparks occurring at the latest or rightward-most part of the spark event are advanced the least.

A comparison of the high data rate signal A and the low data rate signal B reveals that the high data rate signal A provides greater spark timing accuracy during dynamic engine conditions. Using the low data rate signal B, extrapolations based on data earlier received at one engine speed become inaccurate when it becomes time to fire the spark, if engine speed is changing. Use of a high data rate signal, however, requires more processing and memory capability than the low data rate signal, which may be impractical due to cost constraints.

A simulated high data rate signal C combines the advantages of the high data rate and low data rate signals without the disadvantages. Data rate is increased within the spark event window and is zero outside the window. This technique gives the microcomputer enough information to provide an accurate solution during changes in engine speed without tying up the microcomputer's memory and processing time, thereby allowing the microcomputer to perform other tasks outside the spark event. In the preferred embodiment, four pulses during the spark event have been chosen to maximize accuracy and minimize processing requirements for this application.

Also shown in the simulated high data rate signal C is an optional identification pulse P, corresponding in this case to the second pulse from the left. The identification pulse P has a greater pulse width so as to distinguish it from the other pulses in the spark event. In this embodiment, the identification pulse P can be added to first identify two cylinders out of six, both cylinders using the same coil. Use of an identification pulse may obviate the need for a camshaft sensor in bank type fuel injection systems, in which fuel is provided to two cylinders simultaneously. In sequential-type fuel injection systems, in which fuel is sent only to the cylinder to be fired, the identification pulse can be added as a backup for the camshaft sensor. In the latter case, the identification pulse would enable an otherwise trouble free engine to run upon the loss of the camshaft cylinder reference signal.

A camshaft cylinder reference signal and a simulated high data rate signal without an identification pulse are shown for a full 720 engine degrees in FIG. 1(b). In this example, the camshaft cylinder reference signal identifies the cylinder to be fired by first separating the 720° interval into two intervals of 360°, one 360° interval being characterized by a 120° interval having three pulses and the other 360° having a corresponding 120° interval with no pulses. The first cylinder in each 360° interval is characterized by one pulse and the second cylinder in each 360° interval is characterized by two pulses. Thus, at most, three cylinder event times must pass in order to synchronize the cylinders with the ignition system. The microcomputer counts the number of pulses between spark events to determine the coil to be fired.

Figure 2:
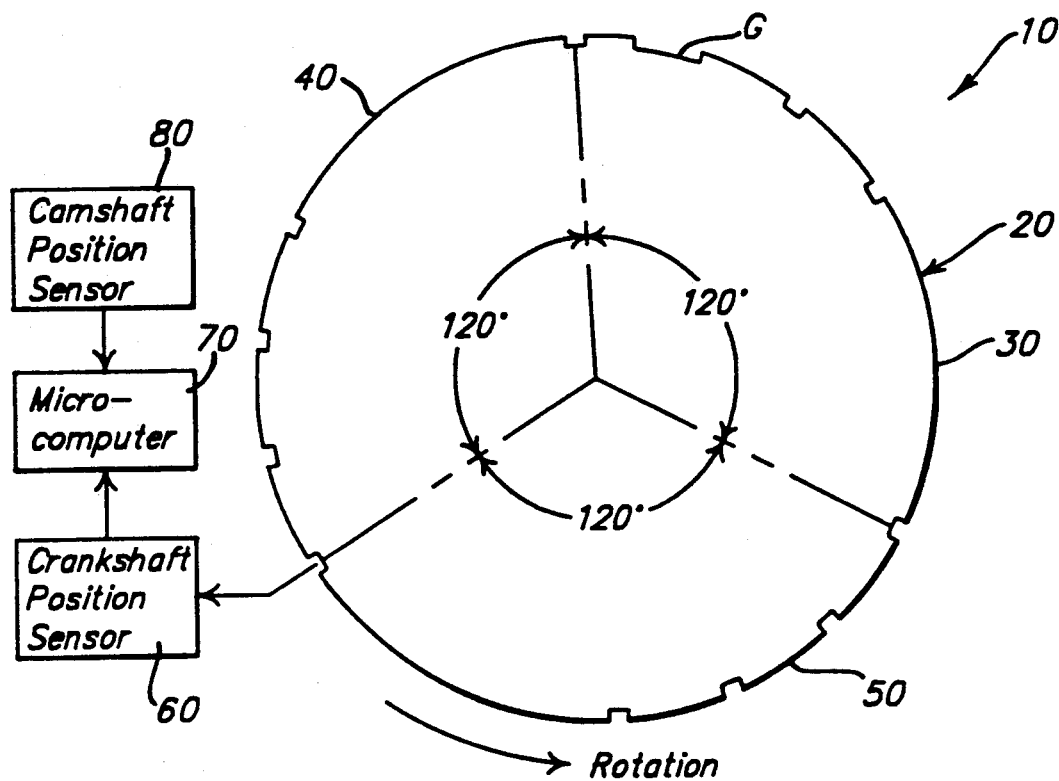
FIG. 2 is a diagram of a crankshaft position and rotation sensing system, including a cross-sectional view of a flywheel and a sensor.

Turning now to FIG. 2 there is shown a crankshaft position and rotation sensing system 10 incorporating a simulated high data rate signal. A flywheel (or other wheel coupled directly or indirectly to the crankshaft) cross-section 20 is divided into 120° intervals 30, 40 and 50, each interval being associated with two cylinders, and each cylinder being fired once every 720°. Along each 120° interval is a spark event, during which time the cylinder is fired. Each spark event is characterized by four gaps in the flywheel corresponding to the four pulses in the simulated high data rate signal. In the preferred embodiment, a magnetic sensor 60 is mounted in proximity with the flywheel 20 to sense movement of the gaps as they rotate past it. The leading edge of each gap causes the leading edge of the corresponding pulse. Likewise, the trailing edge of each gap causes the trailing edge of the corresponding pulse. The high data rate signal from the magnetic sensor 60 is coupled to the microcomputer 70 for processing. Also shown is a camshaft position sensor 80, which generates the cylinder reference signal of FIG. 1(b) to aid the microcomputer 70 in sequencing the ignition system to the cylinders.

In 120° interval 30 the second gap G is substantially wider than the other three gaps (or any gap anywhere on the flywheel) and is responsible for producing the unique identification pulse P of FIG. 1(a). Passage of the wider gap G past the magnetic sensor 60 alerts the microcomputer 70 that the cylinder to be fired is one of two. Since one coil is used to fire both cylinders, firing of a cylinder tells the microcomputer 70 through the "waste-spark" method which cylinder is being fired. This synchronizes the cylinders to the ignition system.

Figure 3:
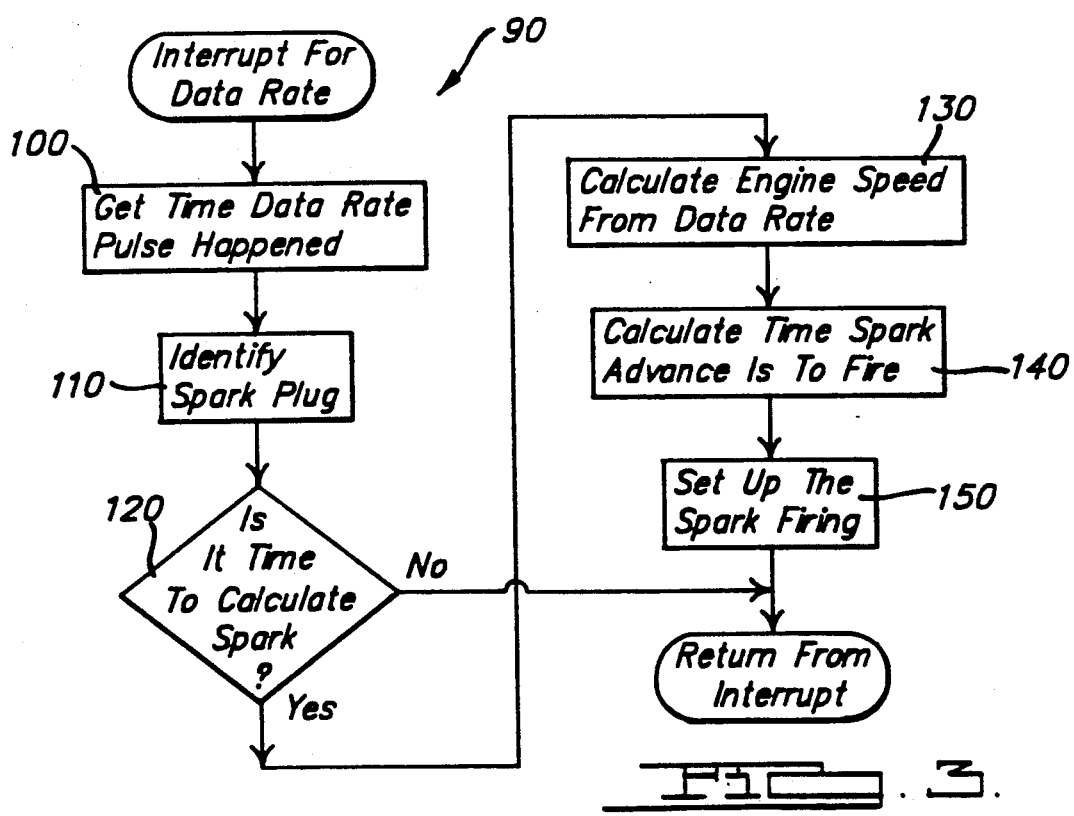
FIG. 3 is a flow chart illustrating the method of the present invention.

The method of the present invention is summarized in FIG. 3 and is characterized by a data rate handling routine 90 which may, for example, be programmed into a microcomputer of an ignition system. The routine 90 begins before a spark event by looking for a simulated high data rate pulse. When it occurs, the first simulated high data rate pulse causes an interrupt in the microcomputer 70 which signals the routine in block 100 to obtain the time the simulated high data rate pulse occurred. For distributorless ignition systems, the spark plug to be fired must be identified in block 110, preferably by a signal such as the cylinder reference signal of FIG. 1(b) or the unique (for example, widened) pulse P of FIG. 1(a). In block 120, the right edge of the simulated high data rate pulse signals the routine to ask, "Is it time to calculate spark advance?" If it is the right edge of the final pulse within the spark event, then the answer is "no" and the routine awaits the next spark event. If the answer is yes, then engine rate of rotation is calculated in block 130 from the data rate. The time on one edge is subtracted from the time on the last edge and divided into the gap width to yield engine speed. A previous engine speed may be subtracted from a current engine speed and the result divided by the time between the two pulses to yield average engine acceleration. In block 140, the routine then calculates the time the spark is to fire by extrapolating from the time of the previous pulse using the calculated engine speed and, if greater accuracy is required, using the calculated engine acceleration. In the next block 150, a spark timer is set up to fire the spark plug at the calculated time. Once the spark plug is fired, the routine waits for the next spark event to occur.

Although the invention has been described with particular reference to certain preferred embodiments thereof, variations and modifications can be effected within the spirit and scope of the following claims.

What is claimed is:

1. A method for periodically firing spark plugs associated with cylinders of an internal combustion engine in a predetermined firing sequence and within associated cylinder event time intervals, the method comprising the steps of:
    (a) simulating a high speed by generating only within a predefined spark event time portion of each cylinder event time interval a plurality of data pulses whose repetition rate is related to rotational speed of the engine and generating no data pulses outside of the predefined spark event time portion;
    (b) causing one of the plurality of data pulses in a preselected cylinder event time to have a unique pulse width different from any other generated data pulse of any cylinder event time;
    (c) monitoring for a beginning of a spark event time indicated by an occurrence of a first data pulse in the spark event time;
    (d) monitoring for the occurrence of a data pulse having the unique pulse width; and
    (e) thereafter employing the predetermined firing sequence by calculating, within each spark event time portion, a spark firing time as a function of engine speed determined in accordance with the repetition rate of the data pulses.

2. The method of claim 1 wherein the data pulses are generated by sensor means arranged for monitoring a rotating element of the engine and for generating a data pulse whenever a predetermined physical characteristic of the rotating element is in proximity to the sensor means.

3. The method of claim 2 wherein the rotating element comprises a flywheel coupled to an engine crank shaft.

4. The method of claim 3 wherein the predetermined physical characteristic comprises a gap formed in the periphery of the fly wheel.

5. The method of claim 4 wherein the unique pulse width is caused by making the corresponding flywheel gap width different from any other gap width in the periphery of the flywheel.

6. The method of claim 5 wherein the corresponding flywheel gap width is wider than any other gap width in the periphery of the flywheel.

7. The method of claim 1 wherein the occurrence of the unique pulse width identifies a spark plug which is to fired first in the predetermined firing sequence.

8. The method of claim 5 wherein the occurrence of the unique pulse width identifies a spark plug which is to be fired first in the predetermined firing sequence.

* * * * *